US005148351A

United States Patent [19]

Patel

[11] Patent Number: 5,148,351

[45] Date of Patent: Sep. 15, 1992

[54] COOLING APPARATUS FOR ENCLOSED CURRENT LIMITING FUSES

[75] Inventor: Janak R. Patel, Tinley Park, Ill.

[73] Assignee: G & W Electric Company, Blue Island, Ill.

[21] Appl. No.: 694,566

[22] Filed: May 2, 1991

[51] Int. Cl.[5] .......... H01H 85/02; H02B 9/00

[52] U.S. Cl. .......... 361/388; 165/185; 165/905; 174/15.1; 174/65 G; 337/204; 337/247; 337/361; 337/430

[58] Field of Search .......... 165/69, 185, 905; 174/15.1, 16.3, 17 LF, 65 G, 152 G; 357/81, 82; 200/289; 336/57, 58; 337/204, 247; 361/41, 385, 387, 386, 388, 389, 430, 432

[56] References Cited

U.S. PATENT DOCUMENTS

| | | | |
|---|---|---|---|
| 2,131,929 | 10/1938 | Amme | 257/263 |
| 3,033,537 | 5/1962 | Brown, Jr. | 257/263 |
| 3,243,206 | 3/1966 | Samer | 174/65 G |
| 3,313,339 | 4/1967 | Coe | 165/80 |
| 3,406,753 | 10/1968 | Habdas | 165/185 |
| 4,010,437 | 3/1977 | Macemon | 337/204 |
| 4,060,785 | 11/1977 | Hanke et al. | 337/201 |
| 4,092,694 | 5/1978 | Stetson | 361/126 |
| 4,189,695 | 2/1980 | Hirahara | 337/204 |
| 4,460,805 | 7/1984 | Johnson | 174/152 G |
| 4,538,025 | 8/1985 | Coe | 174/525 |
| 4,685,987 | 8/1987 | Fick | 156/247 |
| 4,849,858 | 7/1989 | Grapes et al. | 361/388 |
| 4,853,670 | 8/1989 | Stengard | 338/21 |
| 4,979,074 | 12/1990 | Morley | 361/386 |

FOREIGN PATENT DOCUMENTS

| | | | |
|---|---|---|---|
| 162122 | 2/1958 | Sweden | 174/65 G |
| 262532 | 12/1926 | United Kingdom | 174/65 G |

OTHER PUBLICATIONS

Access Hole Cover, Clark, IBM Tech. Discl. Bull. vol. 22, No. 2, Jul. 1979, pp. 717, 718.

Copy of a paper by J. R. Patel, John S. Schaffer and William R. Rueth entitled, "$SF_6$ Gas Insulated Load Interrupting Switches With Fusing," IEEE Transmission and Distribution Paper #84 T&D 363-8, Mar., 1984.

Copy of p. 15 from a trade brochure entitled, "Puffer[6] PAK TM Load Break Switches".

*Primary Examiner*—Gerald P. Tolin
*Attorney, Agent, or Firm*—Fitch, Even, Tabin & Flannery

[57] ABSTRACT

Cooling rings of resilient thermally conductive material are installed over a current limiting fuse prior to insertion in a canister housing. The cooling rings provide a heat conduction path from the fuse to the canister wall, thereby reducing heat build up within the canister. The cooling rings are provided with recesses to reduce pressure build-up during fuse insertion in a canister.

8 Claims, 2 Drawing Sheets

COOLING APPARATUS FOR ENCLOSED CURRENT LIMITING FUSES

BACKGROUND OF THE INVENTION

1. Field of the Invention

The present invention pertains to current limiting fuses in an enclosed environment, such as that provided by enclosed fuse holders installed in an equipment tank.

2. Description of the Related Art

Many types of electrical equipment, especially power distribution equipment are enclosed in tanks which are filled with a heat conducting fluid. When service to interior components of the equipment is required, the tank must be opened and the fluid temporarily removed to permit servicing operations. Current limiting fuses require occasional removal from the equipment tank over the useful life of the electrical equipment which the fuses protect. Fuse canisters have been employed to maintain the current limiting fuses in a dry environment, shielding electrically energized parts of a fuse from the heat conducting fluid filling an equipment tank. Such canisters are widely used in electrical equipment such as underground distribution equipment, including transformers, and switchgear, which are typically filled with either oil or sulphur hexaflouride heat transfer and dielectric media.

It has been found convenient to mount the canisters on an outside wall of the equipment tank, with an open end of the canister accessible from outside the equipment tank, to thereby allow insertion and removal of current limiting fuses and other components therein. Thus, the heat transfer media within the tank need not be disturbed and dismantling of the electrical equipment is not required to service or inspect a fuse within the canister. The open end of the canister is typically enclosed by a locking cap, and the current limiting fuse per se, is mechanically attached to the cap to facilitate its removal using a "hot stick" or other conventional operator equipment.

Although such canisters offer significant advantages in the servicing and operation of a fuse, they do confine the environment surrounding the fuse body, thus giving rise to the possibility that heat transfer away from the fuse body will be significantly reduced. A study performed by J. R. Patel, inventor of the present invention, John S. Schaffer and William R. Rueth, entitled, *$SF_6$ Gas Insulated Load Interruption Switches With Fusing,* IEEE Transmission and Distribution Paper 84 T & D 363-8, March, 1984 reported significant heat rises in canister-mounted fuses, suggesting that consideration be given to a possible derating of the current limiting fuses in some circumstances, so as to reduce the heat input into the canister. Of course, it is desirable to overcome such drawbacks, especially if an improvement can be found to eliminate heat buildup with a minimal expense in parts and labor, and without requiring modification to existing equipment.

SUMMARY OF THE INVENTION

It is an object according to the present invention to provide improvements in the thermal cooling of fuses in fuse canisters.

Another object according to the present invention is to provide cooling rings which may be quickly and easily inserted over the body of a current limiting fuse, before installation of the fuse in a canister.

A further object according to the present invention is to provide cooling rings with pressure relief to avoid a build up of pressure as a fuse assembly is inserted into a canister.

It is an object according to the present invention to provide thermal heat dissipation for current limiting fuses disposed in a canister housing, by conducting heat from the fuses to the canister walls and thereby for subsequent transfer outside of the canister.

These and other objects according to the present invention which will become apparent from studying the appended description and drawings are provided in an electric fuse and enclosure assembly comprising:

an electric fuse having a tubular housing with an outer surface;

at least one cooling ring disposed about said fuse housing, having an annular body of resilient thermally conductive dielectric material defining an interior bore wall for receiving the electric fuse therethrough and for engaging the outer surface of the fuse housing to conduct heat away therefrom;

the annular body defining at least one recess means for air flow through the annular body;

enclosure means surrounding the fuse, having a generally hollow tubular enclosure with an interior surface and an open end communicating with the hollow interior of the tubular enclosure; and said annular body having an outer periphery and dimensioned to contact the enclosure interior surface so as to conduct heat between the fuse and enclosure.

BRIEF DESCRIPTION OF THE DRAWINGS

In the drawings, wherein like elements are referenced alike.

DETAILED DESCRIPTION OF THE PREFERRED EMBODIMENTS

Figure 1:
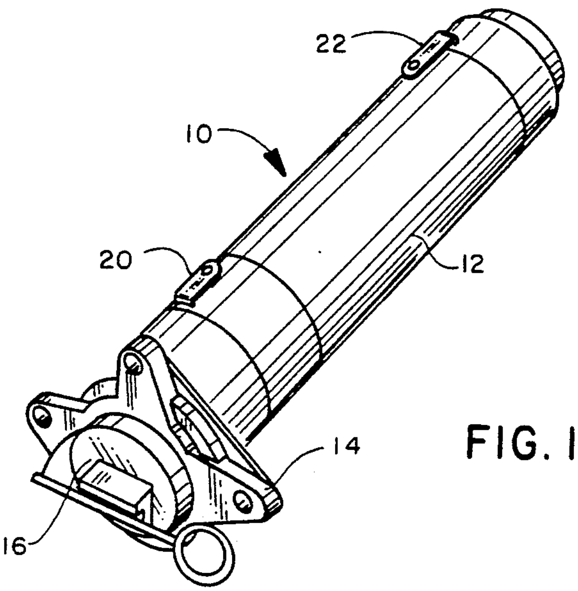
FIG. 1 is a perspective view of a fuse canister.
Figure 2:
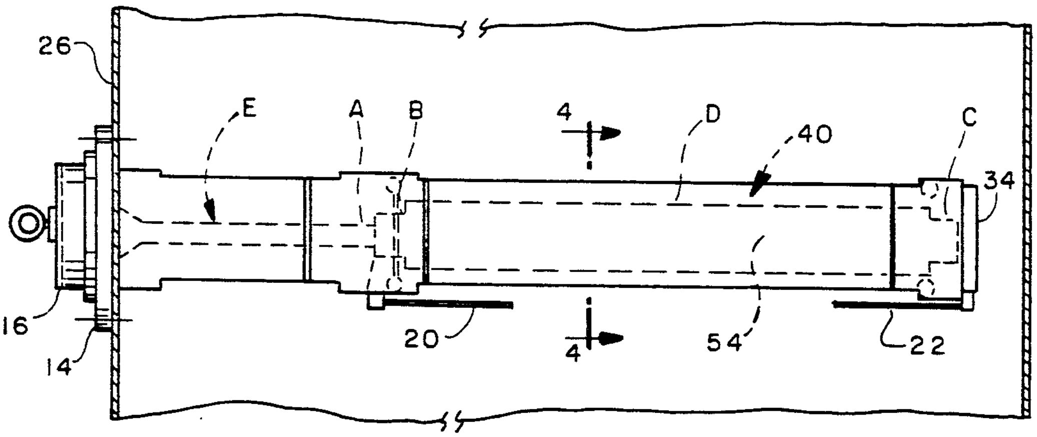
FIG. 2 is a schematic illustration of the canister shown installed in an equipment tank.
Figure 3:
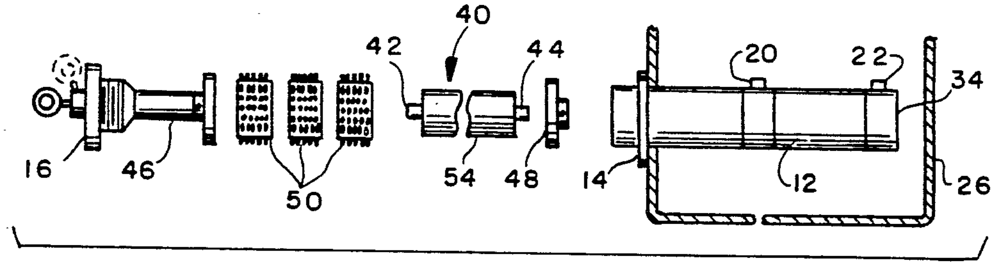
FIG. 3 is an exploded elevational view thereof showing cooling rings according to the present invention.

Referring now to the drawings, and initially to FIGS. 1–3, a fuse canister is illustrated in FIG. 1, in a fully assembled condition. The fuse canister 10 includes a dielectric body 12 having an open end with a mounting flange 14. A locking cap 16 encloses the open end of the canister. Electrical terminals 20, 22 provide internal contact to the ends of a current limiting fuse, and establish a means for connection to external circuitry.

Figure 4:
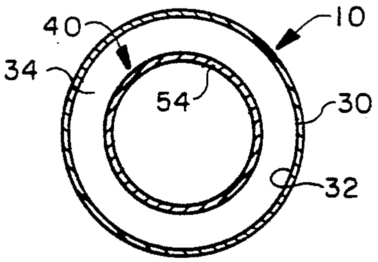
FIG. 4 is a cross-sectional elevational view of the fuse canister assembly of FIG. 2.

Referring now to FIGS. 2 and 3, the canister assembly 10 is installed in an equipment tank 26, which is filled with a dielectric fluid such as oil or sulphur hexaflouride gas. Referring additionally to FIG. 4, the body 12 of the canister includes an outside wall 30, having an interior surface 32. The end of the canister inserted in the equipment tank is enclosed by a wall 34 so that the interior of the canister is maintained dry, out of contact with the heat transfer fluid filling the tank.

Referring to FIGS. 2–4 and particularly to FIG. 3, the canister encloses a current limiting fuse 40, having a pair of opposed terminals 42, 44 for electrical connection through the terminals 20, 22 of the fuse holder to equipment disposed in tank 26. Preferably, the fuse 40 is mechanically connected to cap 16 through a draw-out rod 46. Thus, as the locking cap 16 is unlocked and pulled from the open end of the canister body 12 and telescopically withdrawn therefrom, the fuse is also removed from the canister interior, thus facilitating servicing of the fuse as may be required. The fuse canister is of conventional construction, and is available from a number of different commercial suppliers. In some instances, electrical contacts such as the contacts 48 illustrated in FIG. 3, are required to establish electrical connection between terminal 44 of the fuse and terminal 22 of the canister.

According to one aspect of the present invention, a plurality of cooling rings 50 are telescopically inserted over the outside wall 54 of fuse 40 (see FIG. 4). The cooling rings are in intimate engagement with the outer fuse wall 54 and span the distance between the fuse and the inner surface 32 of the canister. Examples of the cooling rings are illustrated in FIGS. 5–10.

Figure 5:
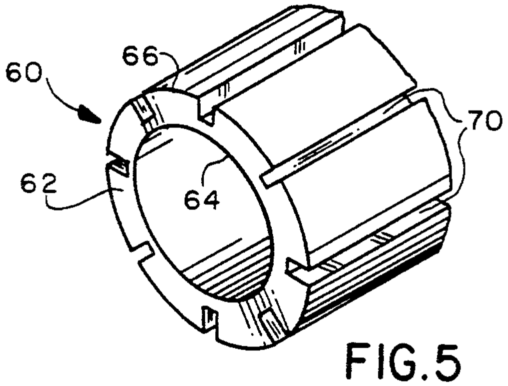
FIG. 5 is a front elevational view of a most preferred cooling ring according to the present invention.

Turning now to FIG. 5, the most preferred embodiment of a cooling ring according to the present invention is indicated at 60. The cooling ring 60, as with the other cooling rings of the present invention, have a generally annular body of resilient, thermally conductive material which is preferably substantially electrically non-conducting. The cooling ring 60 has an annular body 62 with an interior bore wall 64 at its radially inner end and a peripheral edge 66 at its radially outer end. The cooling ring is dimensioned for intimate engagement with both the fuse body 4 and the inside surface 32 of canister wall 30. The cooling ring 60 preferably has an axial thickness on the same order of magnitude as the cooling ring diameter. For example, in one commercial embodiment, a fuse ring 60 having internal and external diameters of 2 inches and 2.75 inches, respectively, has an axial thickness of 1.5 inches. The axial thickness of the cooling ring is important for its heat dissipation capabilities, and a wide range of cooling ring thicknesses can be employed, if desired.

As mentioned above, cooling rings according to the present invention are preferably made of a resilient thermally conductive material. This facilitates an intimate engagement of the bore wall of the cooling ring with the fuse body, and also insures an intimate engagement with the canister wall while facilitating telescopic insertion of the fuse in the canister. As pointed out above, a fuse is mechanically attached to a locking cap 16 through a draw-out rod 46, preferably secured to the cap and forming a portion thereof, to form a fuse assembly. The fuse assembly is then telescopically inserted through the open end of the canister, until the terminal or electrical contact at the leading end of the fuse is seated with the canister terminal 22, thereby establishing electrical contact therewith. Terminal 20 of the canister is arranged so that simultaneous contact is made with the other terminal 42 of the fuse, thereby completing an electrical circuit through the fuse. Owing to the resilient nature of the cooling ring, and its radial dimensioning, the outer periphery 66 of the fuse ring wipes across the inner surface 32 of canister 30 during insertion of the fuse assembly in the canister.

In effect, the fuse assembly which includes cooling rings according to the present invention, acts as a plunger trapping air in the canister interior. Accordingly, continuous air flow passageway means are provided for relieving pressure in the canister, without significant degradation of heat conduction through the cooling ring to the canister wall. In the most preferred embodiment of FIG. 5, radially extending slots 70 are formed in annular body 62 adjacent periphery 66 and extend to the periphery so as to form axially extending grooves in the cooling ring. The depth of the recesses 70 may be adjusted as desired. In one commercial embodiment, the same embodiment described above having an internal diameter of 2 inches and an external diameter of 2.75 inches, the recesses 70 extend 0.25 inches in a radial direction and are approximately 0.125 inches wide. In the preferred embodiment, the recesses 70 are aligned to form a passageway extending in an axial direction, although other configurations such as a spiral or a zigzag configuration may be used to provide a continuous path for escaping air past the annular body of the cooling ring.

Figure 6:
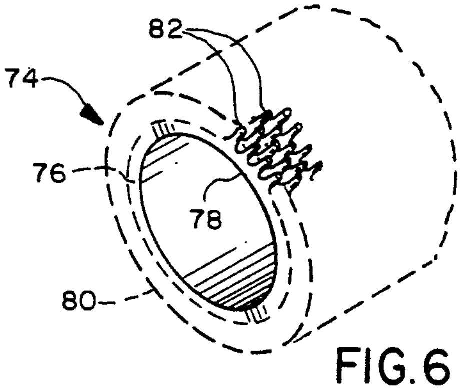
FIGS. 6–10 show alternative embodiments of cooling rings according to the present invention.

Referring now to FIG. 6, an alternative embodiment of a cooling ring is generally indicated at 74. The cooling ring 74 has a generally annular body 76 and an interior annular wall 78 for contacting the fuse body. Recesses are formed in the outer periphery 80 of the cooling ring so as to form a plurality of radially outwardly extending finger members 82. The fingers 82 extend a sufficient distance so as to intimately engage the inner surface 32 of canister 30 to insure a heat conducting relationship therewith. The fingers 82 are so arranged so as to form continuous passageways along the outer surface of cooling ring 74, when fully installed in a canister housing, and in contact therewith.

Figure 7:
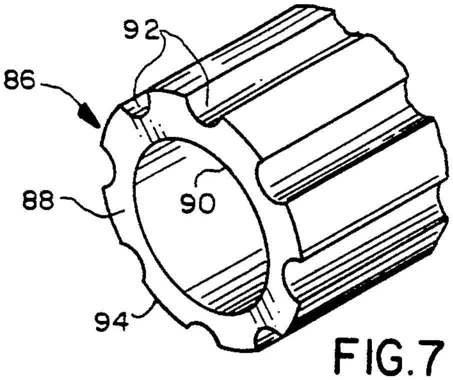

Referring now to FIG. 7, an alternative embodiment of a cooling ring according to the present invention is generally indicated at 86, and has a generally annular body 88. The cooling ring 86 has an interior surface 90 for engaging the fuse body. A series of recesses in the form of concave depressions or ridges 92 are formed on the outer periphery 94 of annular body 88.

Figure 8:
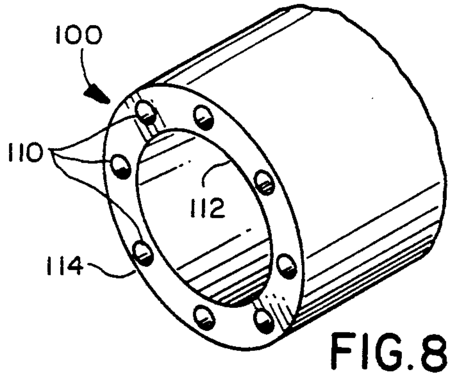
Figure 9:
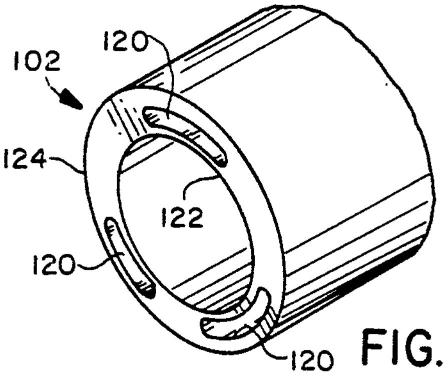
Figure 10:
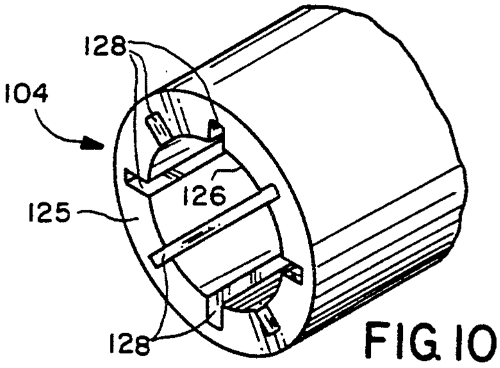

FIGS. 8–10 illustrate generally less preferred embodiments of cooling rings according to the present invention. Each of the cooling rings 100, 102 and 104 illustrated in FIGS. 8, 9 and 10, respectively have recesses extending through the cooling ring annular bodies, which do not communicate with the outer surfaces of those bodies. Instead, the cooling ring 100 of FIG. 8 has a series of passageways 110 formed in interior portions of the annular body of the cooling ring, remote from the interior surface 112 and exterior periphery surface 114 thereof. The cooling ring 102 of FIG. 9 also has internal passageways 120 to relieve air pressure during insertion of the fuse assembly in a canister housing, with passageways spaced remote from the interior and exterior surfaces 122, 124, respectively, of the cooling ring body. To date, canisters have a generally cylindrical interior surface. But as contemplated by the present invention, the canister walls can be "corrugated" so as to have a "daisy ring" transverse cross-section to increase the surface area of the canister wall. Such non-cylindrical canister surfaces will readily accept the cooling rings illustrated in FIGS. 8–10, although if desired, the exterior surfaces of those cooling rings could also be interrupted in the manner illustrated in FIGS. 5–7, for example, so as to have a non-cylindrical configuration.

Referring now to FIG. 10, cooling ring 104 has a generally annular body 125 with an inner surface 126 which is interrupted by recesses 128, which extend throughout the axial length of the cooling ring. As with the embodiments of FIGS. 8 and 9, the cooling ring 104 can be provided with a non-cylindrical interrupted exterior surface provided, for example, in the manner illustrated in FIGS. 5-7.

The recesses of cooling rings 100, 102 and 104 as mentioned, are not positioned at the exterior surface of the cooling rings, and thus, do not provide room for material displacement as the cooling rings, carried on fuse assemblies inserted into a canister housing are compressed during insertion. The recesses 120 of cooling ring 102 offer an advantage in this regard in that recesses formed in the resilient cooling ring material shrink in size as the cooling ring is compressed. Recesses formed at the exterior surface of the cooling rings, on the other hand, provide room for material flow during insertion of the fuse in a canister housing, to thereby reduce the insertion force and are generally preferred for this reason.

As described above, the canister housing and cooling ring assembly peripheries are generally cylindrical in their preferred configuration. However, other configurations are possible. For example, the canister housings can have a frustoconical cavity with an enlarged open end, with the cooling ring assemblies having a complimentary configuration.

Also, the cooling ring assemblies are preferably formed by stacking several rings on the fuse body. Such construction affords quick and easy assembly, especially for cooling rings which intimately engage the fuse body. However, a single piece cooling ring extending along the entire fuse body may also be used. Such a cooling ring could be provided with a longitudinal or spiral slit to facilitate wrapping over the fuse body to produce an intimate engagement therewith when placed in service in the canister housing.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following Claims.

What is claimed is:

1. An electric fuse and enclosure assembly comprising:

- an electric fuse having a tubular housing with an outer surface;
- at least one cooling ring disposed about said fuse housing, having an annular body of resilient thermally conductive dielectric material defining an exterior surface and an interior bore wall which receives the electric fuse therethrough and directly engages the outer surface of the fuse housing to conduct heat away therefrom;
- the annular body defining at least one axially extending recess means remote from the bore wall for air flow along the annular body;
- enclosure means surrounding the fuse, having a generally hollow tubular enclosure with an interior surface and an open end communicating with the hollow interior of the tubular enclosure; and
- said annular body having an outer periphery which is telescopically inserted into the open end of the enclosure means with the annular body exterior surface in contact with the enclosure interior surface so as to conduct heat between the fuse and enclosure.

2. The apparatus of claim 1 comprising a plurality of coaxially aligned cooling rings on said fuse housing arranged with the recesses thereof aligned so as to form a continuous passageway to relieve pressure in the general direction of the tubular fuse housing as the fuse is telescopically inserted into the enclosure.

3. The apparatus of claim 1 further comprising a plurality of fin means outwardly extending from the annular body and integrally formed therewith to comprise a unitary member, said fin means separated by said at least one recess means so as to form a continuous passageway to relieve pressure in the general direction of the tubular fuse housing as the fuse is telescopically inserted into the enclosure.

4. The apparatus of claim 1 wherein said recess means are located at the outer periphery of the annular body.

5. The apparatus of claim 1 wherein said annular body has an outer periphery and said recess means extend to said periphery in a radially outward direction away from said interior bore wall.

6. The apparatus of claim 4 wherein said annular body has an outer periphery and said recess means extend to said periphery in a radially outward direction away from said interior bore wall.

7. The apparatus of claim 1 wherein said annular body has an outer periphery and further comprises a plurality of fin means on said fuse housing outwardly extending toward the periphery of the annular body and integrally formed with the annular body to comprise a unitary member, said plurality of fin means separated by said at least one recess means which extends to said periphery in a radially outward direction away from said interior bore wall; and

- said apparatus further comprises a plurality of coaxially aligned cooling rings arranged with the recess means thereof aligned to form a continuous passageway extending generally in the direction of the tubular fuse housing to relieve pressure as the fuse is telescopically inserted into the enclosure.

8. The apparatus of claim 1 wherein said recess means comprise apertures formed in said annular body remote from said periphery and said interior bore wall.

* * * * *